United States Patent [19]

Siems

[11] Patent Number: 4,654,660

[45] Date of Patent: Mar. 31, 1987

[54] OPTICAL TELEMETRIC TRANSCEIVER

[75] Inventor: Lee E. Siems, Richmond, Tex.

[73] Assignee: Litton Resources Systems, Inc., Alvin, Tex.

[21] Appl. No.: 690,110

[22] Filed: Jan. 9, 1985

[51] Int. Cl.[4] .............................................. G01V 1/22
[52] U.S. Cl. .................................. 340/870.29; 367/76
[58] Field of Search ...................... 367/14, 20, 76, 79; 340/870.29

[56] References Cited

U.S. PATENT DOCUMENTS

| | | | |
|---|---|---|---|
| 3,881,166 | 4/1975 | Fort et al. | 340/15.5 |
| 3,883,725 | 5/1975 | Fort et al. | 235/151.3 |
| 4,023,140 | 5/1977 | Siems et al. | 340/15.5 |
| 4,031,504 | 6/1977 | Mioduski | 340/15.5 |
| 4,072,923 | 2/1978 | Siems et al. | 340/15.5 |
| 4,092,629 | 5/1978 | Siems et al. | 340/15.5 |
| 4,117,448 | 9/1978 | Siems | 340/15.5 |
| 4,360,729 | 11/1982 | Harvey et al. | 367/76 X |

FOREIGN PATENT DOCUMENTS 2087680  5/1982  United Kingdom ................ 367/14

Primary Examiner—Jerry W. Myracle
Attorney, Agent, or Firm—Barry C. Kane; Robert E. Lowe

[57] ABSTRACT

An optical telemetric system for use in seismic exploration consists generally of a recorder, a plurality of transceivers, and a like number of cable sections interconnecting each transceiver in parallel with others and the recording unit. A fiber optic transmission channel is provided within each cable section and is interconnected by an optic-fiber delay loop within each transceiver, thus providing a contiguous, optically-continuous data and control channel. Within each transceiver, a logic circuit and associated data acquisition unit is optically coupled to the data and control channel so as to bidirectionally receive signals from, and transmit signals to the recorder. The logic circuit of each transceiver also is able to measure the strength of a received signal propagating in the data and control channel, and if necessary, augments the signal in the original propagation direction. An optical direction sensing circuit is interfaced with each logic circuit for electronically facing each transceiver towards the recorder. The instant invention thus reduces the effect of the series reliability law upon regenerated data.

9 Claims, 5 Drawing Figures

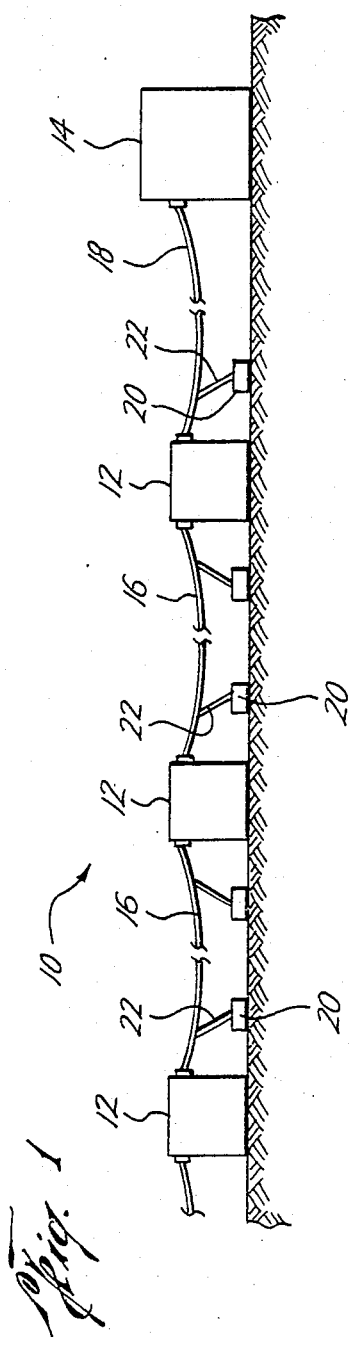
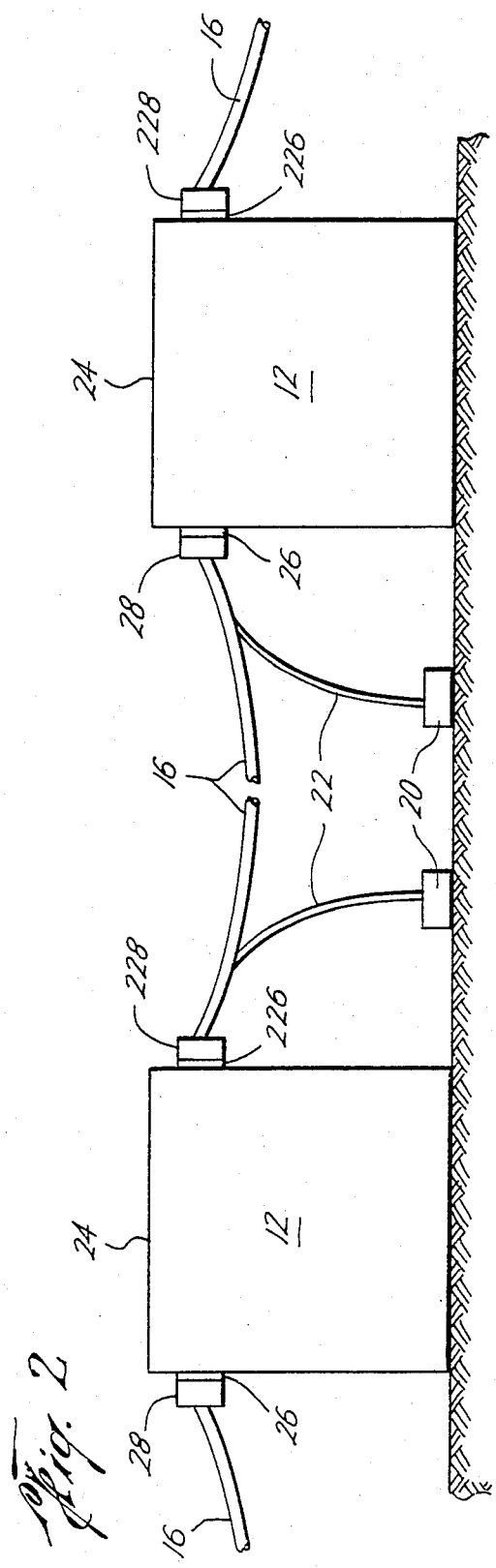

1

OPTICAL TELEMETRIC TRANSCEIVER

BACKGROUND OF THE INVENTION

1. Field of the Invention

This invention relates to seismic exploration systems and particularly to an improved transceiver for use in a data telemetric system.

2. Description of the Related Art

Recent developments in seismic exploration demand the use of several hundred to thousand seismic sensor groups, each group containing one or more sensors electrically interconnected to form a single channel. Early telemetric systems required cables having many hundred conductor pairs, one pair for each sensor group, to transmit analog seismic-data signals from the sensor group to a central, multichannel, data processing and recording unit. Cables containing individual sensor conductor pairs become impractical for use in large spreads because of the sheer bulk of the cable. Conventional telemetric systems have much fewer conductor pairs for transmitting data, interrogation, and control signals to the entire spread.

U.S. Pat. Nos. 3,881,166 and 3,883,725 issued to Fort et al. disclose a telemetric system consisting essentially of a plurality of cable sections interconnected by a like number of array terminals spaced over the ground in a two-dimensional array. Each array terminal has a plurality of conductor pairs, each pair connected to a sensor or sensor group. Additionally each array terminal contains a plurality of input-output ports for receiving a similar number of cable sections. Each cable section includes conductors for transmitting power, data, and control signals.

The array terminals have a logic network inside, arranged so the control signals will be received by the first terminal, processed, and be retransmitted to a second array terminal through the cable section connected to the next sequential port. Data transmitted back to the recording unit indicates which port is in use and which port is connected to the recording unit.

U.S. Pat. No. 4,117,448 assigned to the assignee of this invention consists of a plurality of cable sections laid end-to-end along a predetermined line of survey. The cable sections are interconnected by a like number of transceiver modules. Each cable section contains a plurality of conductor pairs and a bidirectional telemetric link. The conductor pairs transmit power and connect the sensor groups to the transceiver modules. The telemetric link transmits control and data signals between each transceiver module and the recording unit.

The transceiver modules contain well-known signal multiplexing and digitizing logic to accept analog input signals from the sensor groups that are interconnected externally to the cable sections. Signals from the sensor groups associated with a given cable section and transceiver module are sampled in sequence, digitized as digital data, and transmitted by the transceiver module over the telemetric link to an adjacent transceiver module. The adjacent transceiver module receives and retransmits the data to another transceiver and so on until the data are received by the recording and control unit. According to a preselected transmitting sequence, the addresses of the transceivers from which the data arrive at the recording and control unit are known.

In the above-identified patents, the transceiver modules and cable sections are unpolarized. The systems can receive data interrogation signals from a plurality of directions and are capable of determining which direction to transmit the data to the recording and control unit. Each transceiver module contains an electrical direction sensing device which determines the direction in which the recording and control unit is located. The direction sensing signal is maintained within each transceiver module until electrically reset by the recording and control unit.

A major disadvantage to the aforementioned patents is that all the transceivers or terminals are interconnected in series to the recording and control unit. These systems are subject to a series reliability law. That is, each transceiver module is dependent on the previous transceiver module for the retransmission of signals. If a transceiver module becomes inoperational or malfunctions, the following transceiver modules become crippled or reflect the malfunction in the bad transceiver.

A second disadvantage of the above art is related to the series reliability law. That is, the greater number of times a signal is retransmitted, the greater the chance for the signal to be distorted.

It is an object of the instant invention to provide a telemetric system where at least one continuous broadband telemetric channel interconnects a plurality of transceiver modules thereby reducing the number of signal retransmissions.

It is another object of this invention to provide a telemetric system where adjacent transceiver modules are mutually independent of each other.

It is yet another object of this invention to provide a telemetric system where the data are not influenced by electromagnetic interference.

It is yet a further object of this invention to provide a telemetric system where the data are repeated only when necessary to maintain a prescribed signal strength.

BRIEF SUMMARY OF THE INVENTION

In this invention, I provide an optical telemetric system having an uninterrupted telemetric channel interconnecting a plurality of transceiver units.

In an aspect of this invention, a plurality of unpolarized transceiver units are interconnected with each other and a recording unit by a like number of cable sections. A plurality of sensors or sensor groups are deployed between each transceiver and are connected to the cable sections by short connectors or "takeouts". Each cable sections includes at least one bi-directional fiber optic telemetric line and conductor pairs to supply power and connect the sensors to the transceiver electronics. The transceivers contain signal multiplexing and digitizing logic to accept analog seismic signals from several sensors. The seismic signals from the sensors associated with a given cable section and transceiver are sampled in sequence, digitized as digital data, and transmitted by the transceiver to the recording unit. The transceivers and telemetric lines are unpolarized and bi-directional. Accordingly, the recording unit may be connected to the cable spread at any randomly convenient location. The term "up stream" is defined as the direction of the recording unit with respect to the transceiver. Adjacent cable sections are connected to a data transceiver by mating multiconductor connector plugs. At least one pin of the connector plug retains an end of the bi-directional optical telemetric line for transmitting command and data signals. The telemetric line is continuous through each transceiver by an optical delay-loop interconnecting the telemetric lines of adjacent cable sections. Remaining pins of the connector plugs carry leads from the sensors and DC power for the electronics.

In accordance with another aspect of this invention, a pair of optical branches, one directionally coupled to each end of the delay loop, are in optical communication with the delay-loop. Each optical branch is also optically coupled to a transmitter/receiver diode pair for receiving and launching optical signals into the delay loop in opposing directions. A direction sensing circuit is interfaced with each diode pair for electrionically facing the transceivers, "up-stream", towards the recording unit.

In accordance with yet another aspect of this invention, a signal propagating through the delay loop is monitored by the electronics within the transceivers. Signals that are below a preselected signal strength are augmented by having the detecting transceiver re-emit the signal in the original propagation direction. The retransmitted signal propagating through the optical branch arrives at the directional coupler coincident with the original signal propagating through the delay-loop, thereby increasing the signal strength. The instant invention thus substantially-overcomes the series reliability law which effects a repetitive series of transceivers.

BRIEF DESCRIPTION OF THE DRAWINGS

A better understanding of the benefits and advantages of my invention may be obtained from the appended detailed description and the drawings, wherein:

FIG. 1 is a diagram of a telemetric system embodying the instant invention;

FIG. 2 is an exploded view of a cable section and associated transceivers;

DETAILED DESCRIPTION OF THE PREFERRED EMBODIMENT

Figure 3:
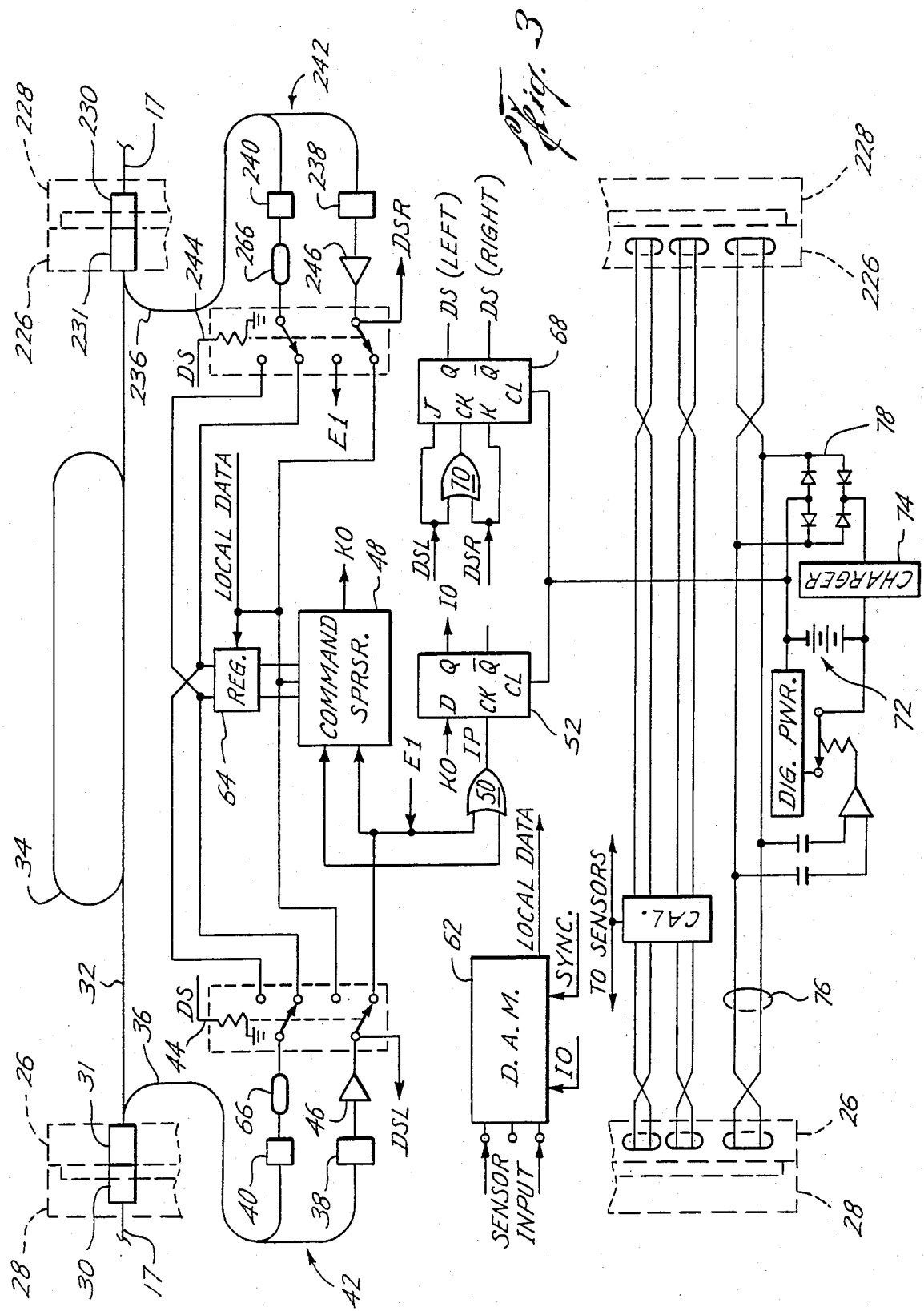
FIG. 3 is a schematic block diagram of the optical and electronic circuitry contained in a transceiver.

FIG. 1 is a simplified diagram of a seismic data acquisition and telemetric system 10. Identical transceiver units 12 are interconnected to each other and a recording unit 14 by identical cable sections 16 and lead cable 18. A plurality of sensors 20 are distributed between the transceivers 12 and connected to the cable sections 16 by short connectors or "takeouts" 22. Signals generated by the sensors 20 are processed by electronic circuitry within the transceivers 12 and are sequentially transmitted to the recording unit 14 in response to interrogation signals received from the recording unit 14.

Only three transceiver units 12 are shown in FIG. 1, but in reality up to 400 or more such transceiver units may be employed. Of the total number of transceiver units deployed, a subset including only a fraction of the total number may be activated at any one time.

The transceiver units 12, and cable sections 16 are unpolarized, symmetrical, and bi-directional. They have no preferred linear orientation with respect to the recording unit 14. Accordingly, transceiver units 12 contain a direction sensing circuit to orient the transceiver units so that they will electronically "face" the recording unit and transmit data regardless of their physical location and orientation with respect to the recording unit.

Referring again to FIG. 1, the sensors 20, transceivers 12 and their interconneting cable sections 16, are collectively termed a "spread". Recording unit 14 may be connected into the spread at any randomly convenient location.

When the seismic recording operation at a station has been completed, the next recording station will be located forward of the previous station. Accordingly, the last sections of the spread are deactivated and physically moved to the front of the spread. The recording unit 14 need not be physically moved, but the recording unit 14 may be moved electrically or "rolled along" by switching electronic circuitry such as described in U.S. Pat. No. 4,023,140 assigned to the assignee of this invention. In an actual field operation, many transceiver assemblies would be laid out well ahead of the recording unit 14 along the line of survey. The recording operation can thus continue uninterrupted while deactivated transceiver assemblies at the rear of the spread are moved forward ahead of the recording unit as the survey rolls along.

FIG. 2 is an expanded illustration of two transceiver units 12 associated with an interconnecting cable section 16. A typical transceiver unit 12 consists of a housing 24 and two female connector sockets 26 and 226 which may be at opposite ends of the housing. Housing 24 contains the transceiver and associated seismic data processing electronics; circuits for receiving and identifying command and interrogation pulses, a direction-sensing circuit, pulse regenerators, and a power supply. The transceiver unit 12 is light weight and is easily hand carried.

The transceiver units 12 are interconnected by cable sections 16. Each cable section 16 may be of any desired length and is terminated at each end by identical male plugs such as 28, 228 that mate with female plugs 26, 226. Either end of cable section 16 may be plugged into either end of the transceiver unit housing 24. The cable section 16 includes at least one fiber-optic telemetric channel 17 and several wire conductors for power, sensor leads, and miscellaneous auxillary units. The cable diameter is relatively small, and when coiled up may be easily carried by one attendant.

External connections or takeouts 22 provide connections between cable 16 and the sensors 20. Although only two takeouts and sensors are shown on each end, a greater number of takeouts for a like number of sensors or sensor groups may be preferred. It is commonplace to employ a group of sensors ranging in number from 3 to as many as 16 sensors per takeout. Separate conductor pairs feed signals from each sensor or sensor group to a corresponding input channel in the data processing electronics within the transceiver housing 24. Thus each sensor or sensor group provides a single channel of data. The processing electronics accepts two sets of sensor groups. Accordingly each transceiver 12 processes two channels of local data.

The electronic packages contained within the transceiver housings consist of the major component blocks listed below. Some of the blocks have already been described in detail in certain U.S. Patents assigned to the assignee of this invention. Pertinent patents describing specific blocks are identified below and are incorporated herein by reference:

Charge Circuit and Standby Control, FIGS. 3A and 3B, U.S. Pat. No. 4,117,448;

Power Supply, FIGS. 3A and 3B, U.S. Pat. No. 4,117,448;

Sensor Calibrate Control, U.S. Pat. No. 4,092,629;

Data Acquisition Module, U.S. Pat. Nos. 4,031,504 and 4,072,923.

In the following description of the logic circuits, reference will be made to the two states which are normally found in any such logic circuits. The two states may be considered to represent binary signals and are often referred to as a logic-ONE and logic-ZERO. The logic states represent voltage levels. A predetermined, relatively high voltage such as 2-5 V is taken to be a logic-ONE; a lower voltage level such as 0-0.8 V is a logic-ZERO.

As pointed out earlier, the function of a transceiver unit 12, is to transmit local data to the recording unit in response to a control signal. Following transmission of local data, the transceiver unit 12 monitors, and if necessary augments the data signal transmitted from downstream transceivers to the recording unit.

Throughout the specification, commands will be written in capital letters. Thus MODE-CM is the command that sets the transceivers in the CM mode.

Referring to FIG. 3 the electronic and optical circuitry contained within a transceiver 12 is shown in block diagram form.

Each transceiver 12 operates in two modes: MODE-CM, the command or setup mode and MODE-TM, the transmit and monitor mode. Mode selection is made by the recording unit 14 and sent to each of the transceivers 12 over the telemetric channel in the form of a binary coded signal. The length of the coded signal depends upon the number of options to be preset.

In the command mode or MODE-CM, the transceivers are electronically oriented with respect to the recording unit, addressed, and armed so that after they are switched to the transmit and monitor mode, MODE-TM, they will perform some desired function. The desired function is enabled by the reception of a coded command pulse at a specified command register. For example, assume a set of one hundred cable sections and transceivers are interconnected to form a spread with the recording unit connected to one end. If it is desired that a subset of only 50 transceivers located in the middle of the spread shall acquire and transmit local data, the 25 intervening transceivers between the selected subset and the recording unit will remain in a passive state to monitor and if necessary augment command, control, or data pulses from the more remote subset of fifty transceivers. Local data transmission by the nonselected transceivers will be inhibited.

After the transceivers have been oriented, addressed, and armed in the command mode, they are switched to the transmit and monitor mode, MODE-TM. In the transmit and monitor mode, an interrogation pulse is transmitted to the transceivers. As each of the previously armed transceivers successively receives the interrogation signal, it transmits its local data to the recording unit and stands ready to monitor, and if necessary, augment or amplify data signals from the downstream transceivers that have been activated.

With this brief functional introduction, FIG. 3 may now be studied in detail.

Data signals, and command and control signals are transmitted as light pulses between the recording unit 14 and the respective transceivers 12 through a fiber-optic telemetric line 17. The optic-fiber line 17 may be of any well known low-loss type such as the plastic coated optical fibers BNR 7-1-A, supplied by Bel-Northern Research, Ottawa, Quebec.

Optic fibers are used bidirectionally. That is, command and control signals may be transmitted from the recording unit 14 and data are transmitted to the recording unit 14 through the optic fiber in the opposite direction although not at the same time.

As mentioned earlier, each cable section 16 contains at least one optic fiber line such as the type mentioned above. Each end of the fiber 17 is terminated by optical end-couplers 30 and 230 retained in male plugs 28 and 228 respectively. The optic end-coupler retained in male plugs 28, 228 mate with substantially identical end couplers 31, 231 terminating each end of an optic fiber 32 extending through the transceiver housing 24. Thus a contiguous telemetric channel is provided the length of the spread, interrupted only by the end couplers within the connectors. The optic fiber 32 has a delay loop 34 of suitable length to be discussed later. Directionally coupled to each end of optic fiber 32 are optic-fiber branches 36, 236 that can receive a signal from, or transmit a signal into fiber 32. Since optic-fiber branches 36, 236 must both receive and transmit, the free ends of fibers 36, 236 are terminated with a photo detector 38, 238 such as the Motorola MFOD-2404 and a laser diode 40, 240 such as the ML-4307 laser diode made by Mitsubishi. Photo detector 38, 238 and laser diodes 40, 240 are optically coupled to fibers 36, 236 respectively by fused optic fibers 42, 242.

Assuming the recording unit 14 is to the left of the transceiver 12 in FIG. 3, commands from the recording unit 14 flow from left to right and local data signals flow from right to left. With the direction sensing switches 44, 244 in the position shown, command pulses (K) or interrogation pulses (I) are received by photo detector 38 and are amplified by preamplifier 46. Leaving preamplifier 46, the pulses propagate to a Command Supervisor (CS) 48 and to an OR-gate 50. The Command Supervisor contains logic circuits to decode, interpret, and enable desired functions within the transceiver 12.

Command pulses (K) and interrogation pulses (I) consist of coded binary pulses. Command pulses (K) are recognized and accepted by the Command Supervisor 48. After receiving and accepting command pulse (K), the Command Supervisor 48 issues a command output (KO) that is passed to the D-input of a command register 52 such as the Motorola MC54/74HC74. The switching function of the command register 52 can only occur when a command output (KO) and a pulse are simultaneously present at the D and CK inputs respectively. The issuing of a command output (KO) from the Command Supervisor 48 changes the operational mode of the transceiver from MODE-CM to MODE-TM.

Figure 4:
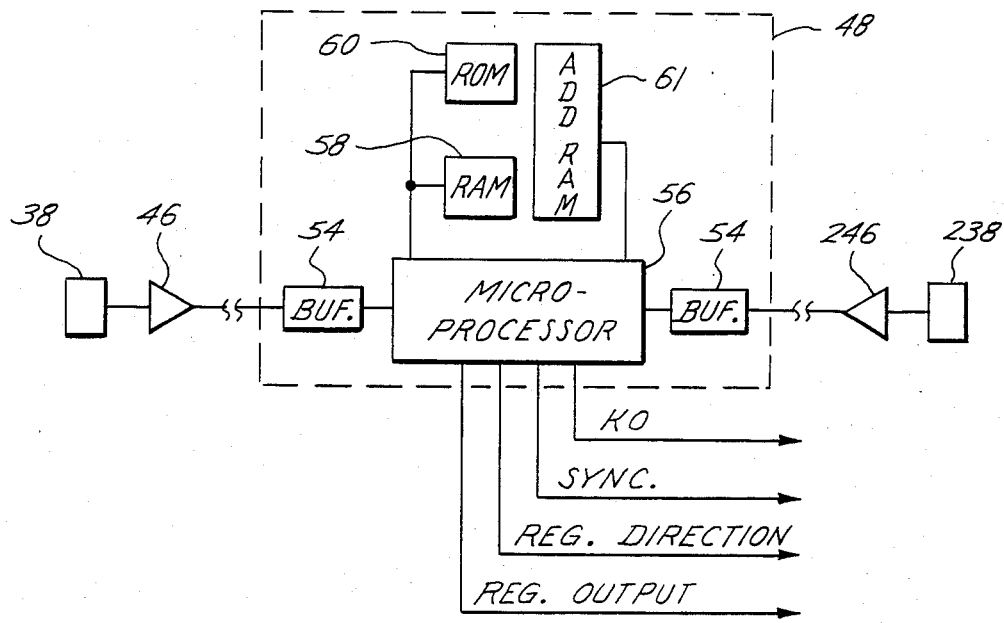
FIG. 4 is a schematic block diagram of the command supervisor.

Refer now to FIG. 4 with particular reference to the Command Supervisor 48. Command Supervisor 48 receives command (K) and interrogation (I) signals at buffer 54 before passing them to a command supervisor microprocessor (CSM) 56. The CSM 56 stores the command temporarily in a random-access-memory (RAM) 58 and processes the command according to a program in a read-only-memory (ROM) 60. Upon deciphering the command, the CSM 56 may issue commands to other circuits within the transceiver 12.

Referring back to FIG. 3, the simultaneous arrival of pulses at the D and CK inputs of command register 52 enables the Q output, passing an interrogation output (IO) to a data acquisition module (DAM) 62. A syncronization pulse arrives simultaneously from the command supervisor 48, instructing the DAM 62 to transmit local data. The local data are passed to a command/data regenerator 64. An output from the command supervisor 48 enables the regenerator 64 to transmit local data to laser-diode driver 66 which operates laser diode 40. The laser diode 40 launches the local data into fiber 36 which in turn transmits the data into optic fiber 32 towards the recording unit 14.

As stated earlier, since the cable sections 16 and the transceivers 12 are unpolarized and bidirectional, a means must be provided to electroncially face the spread so that data may be transmitted to the recording unit 14. The direction sensing circuit consists of a J/K-type flip flop command register 68 such as the Motorola MC54/74HC73 with the J and K inputs receiving pulses from preamplifiers 46 and 246 respectively. The CK input is enabled by an OR-gate 70 which is activated by preamplifiers 46 or 246. When a pulse is received at photo detector 38, preamplifier 46 enables Q output of the command register 68, switching direction sensing circuits 44 and 244 in the position shown. Conversely, an initial photo-input at photo detector 238 causes preamplifier 246 to enable the Q output, forcing direction sensing switches 44, and 244 to the upper contacts. Command register 68 is reset by the power charging circuit when connected to the spread.

In an embodiment of this invention, the transceivers 12 are powered by a 12 V rechargeable battery 72. Battery 72 is continously under trickle-charge by charger 74 from a voltage applied to power line 76, through a full wave rectifier 78 floating across the line. The power line 76 is connected to pins in connector sockets 26 and 226 to be interconnected to the cable sections 16 and the recording unit 14.

Scrutiny of the diagram will show that the propagation direction of control pulses is again left to right, and data flow is right to left. Now relocate the recording unit 14 to the right of FIG. 3, and receive the first optical signal at photo detector 238. The output from photo detector 238 will result in the Q output of command register 68 being true. Relay switches 44 and 244 are actuated to move switch contacts to the upper terminals. Close examination of the diagram will demonstrate that control signal flow is right to left and the data flow is now left to right. The direction sense operation takes place as soon as an initial optical pulse is received by one of the two photo detectors. Relays 44 and 244 are shown as mechanical relays, but in actual practice, they would be electronic switches.

In operation in MODE-CM, the system functions as follows: Power is transmitted along conductor pairs 76, resetting command registers 52 and 68, and providing DC power to the transceiver circuitry. Initially an optical command pulse (K) is sent from the recording unit 14 along cable sections 16 to the transceivers 12. A portion of the command pulse (K) entering optical end coupler 30 is transmitted into optic-fiber branch 36 and received by photo detector 38. The remaining portion of the command pulse continues along optic-fiber delay loop 34. Upon reception of the command pulse (K), photo detector 38 generates an output that is amplified by preamplifier 46. Leaving the preamplifier 46, the pulse is passed to command register 68 and OR-gate 70, setting the direction of the relay 44 and 244 to electronically face the recording unit 14. The direction setting operation takes only a few picoseconds. Substantially concurrent with setting the direction relays, the command pulse (K) is passed to the Command Supervisor 48. The Command Supervisor contains suitable logic to count the number of pulses received. The number of pulses received indicates the address of that particular transceiver. At the end of counting the pulse the Command Supervisor 48 enables the command/data regenerator 64 to issue a pulse of unit length to be generated at laser diode 240. The regenerated pulse propagates up optic fiber 236 and arrives at end coupler 231 so as to be added to the end of the original command pulse (K) traveling through optic fiber delay loop 34. Accordingly, the address of the adjacent down-stream transceiver will be increased by one. The delay loop 34 is of appropriate length to allow time for logic decisions to occur in the transceiver electronics.

A second command pulse (K), sent from the recording unit 14 to the transceiver 12 consists of a coded binary signal preceded by the transceiver address, arming the desired transceivers. The second command pulse (K) is received at the Command Supervisor as previously outlined. The logic within the supervisor recognizes the command and issues a command output (KO) which enables command register 52 to pass subsequent interrogation pulses (I) from the recording unit to the DAM 62. It is the reception of the second command pulse that places the transceiver in MODE-TM, the transmit and monitor mode.

In MODE-TM, interrogation pulses transmitted by the recording unit 14 cause each transceiver 12 to acquire a sample of data from the DAM 62. The data may be stored within the DAM memory and transmitted to the recorder as data words, or the data may be transmitted as individual data bits. After each transceiver 12 transmits its data to the recorder, the transceiver stands ready to monitor data flowing up-stream towards the recording unit 14. A portion of the data signals from the down-stream transceivers are transmitted from optic fiber 32 into optic-fiber branch 236. The signals are received at photo detector 238, generating a signal as described above. The received data signal is passed to the command/data regenerator 64 where the signal strength is compared to a pre-programed reference. If the signal falls below the prescribed level, the regenerator causes laser diode 40 to repeat the received signal. The regenerated signal arrives at end coupler 30 simultaneously with the original signal traveling through the delay loop 34 thereby augmenting the signal.

Figure 5:
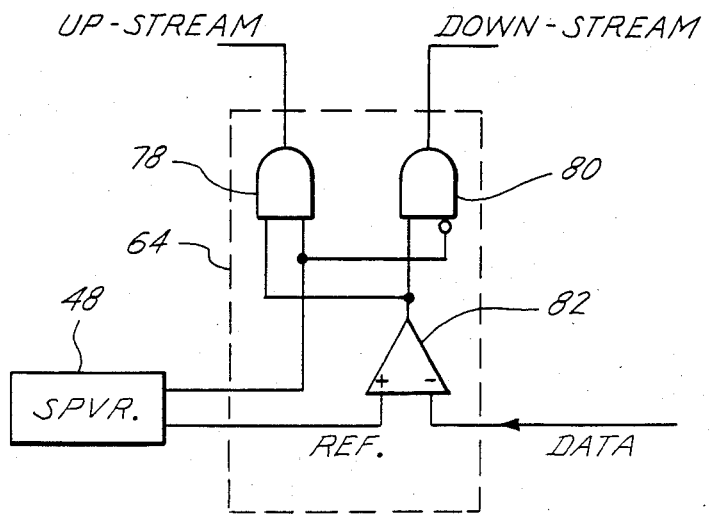
FIG. 5 is a schematic diagram of the command/data regenerator.

Referring to FIG. 5, the command/data regenerator 64 consists of AND-gates 78 and 80 and signal comparator 82. Command signals and local and regenerated data signals are passed to the comparator 82 where the signal strength is compared to a reference. If the signal is below the reference, comparator 82 passes the signal to AND-gates 78 and 80. If the signal is above the prescribed reference, comparator 82 inhibits passing of the data. The direction of regeneration is dependent on the direction sensed by the Command Supervisor 48. As shown in the figure, command pulses received at the Command Supervisor from photo detector 38 are passed to AND-gate 80 making AND-gate 80, true. The gate is enabled by an inversed logic-ZERO. After MODE-TM is true, the command output from Command Supervisor 48 applied to the AND-gates is reversed, enabling AND-gate 78.

In another embodiment of this invention the transceivers 12 and the interconnecting cable sections may be altered for use in aqueous environments. In this embodiment, many transceivers and the associated conductors and optical transmission lines are contained within well known marine cable sections. Each cable section is unpolarized as previously described.

It should be understood that variations of the disclosed circuit are within the scope of the present invention. Accordingly, the scope of the invention is only to be limited by the appended claims.

I claim as my invention:

1. A seismic data telemetric system including recording and control means, a plurality of transceiver units each having a first and a second optical transmitting and receiving means, comprising:
   (a) continuous optical transmission means interconnecting each of the transceivers with each other and to said recording and control means;
   (b) direction sensing means connected to said optical transmitting and receiving means for determining the direction of said recording and control means along said transmission means;
   (c) signal regeneration means, associated with each of said transceivers, for measuring a received signal strength relative to a predetermined value and regenerating a received signal only when said signal strength is less than said predetermined value.

2. The telemetric system of claim 1 wherein said continuous optical transmission means further comprises:
   (a) a plurality of cable sections laid end-to-end to form a spread, each cable section having at least one optic-fiber channel therein;
   (b) a transceiver housing interconnecting each of said cable sections, each housing having a delay loop interconnecting the optic-fiber channel of adjacent cable sections; and
   (c) a lead-in cable section interconnecting the optic-fiber channel with the recording and control means.

3. A telemetric system as defined in claim 1 wherein said first and second transmitting and receiving means, comprises:
   (a) a first and a second fiber-optic branch, each having one end directionally coupled to opposite ends of the delay loop; and
   (b) a first and a second laser diode/photo detector pair optically coupled to the other end of the first and second fiber-optic branch.

4. A telemetric system as defined in claim 1, wherein said direction sensing means further comprises a command register having a first and a second input, each operably connected to one of said transmitting and receiving means, said command register also having a first and a second output each operably connected to a two-position switching means operably coupled to said transmitting and receiving means for electronically facing said transceiver towards said recording and control means.

5. A telemetric system as defined in claim 1 wherein each of the transceivers further comprise:
   (a) data acquisition means having a plurality of input channels and an output channel;
   (b) means for digitizing a signal from each of the input channels;
   (c) means for multiplexing the digitized signals onto the output channel; and
   (d) logic means interconnected with elements (a), (b), and (c), and optically coupled in parallel to said continuous optical transmission means.

6. A telemetric system as defined in claim 1 further comprising means for supplying power to each of the transceivers.

7. A telemetric system as defined in claim 6 wherein said means for supplying power comprises:
   (a) a DC power supply within each transceiver; and
   (b) a conductor pair within each cable section for transmitting DC voltage to each power supply.

8. In a seismic exploration system having means for enabling a desired switching sequence in and data transmission from a plurality of transceivers, each transceiver having a plurality of input channels and an output channel, at least one seismic sensor being connected to each input channel, said system comprising:
   a recording and control unit;
   a plurality of substantially identical cable sections interconnecting said transceivers with each other and with said recording and control unit, the cable sections and the transceivers being unpolarized so that there is no preferred linear orientation of the cable sections with respect to the transceivers and to the recording and control unit, each of said cable sections further including a first bidirectional transmission line for transmitting control and data signals independently of each other and in opposite directions between the transceivers and the recording and control unit;
   a second bidirectional transmission line within each of the transceivers for interconnecting said first bidirectional transmission line in the cable sections;
   means optically coupled to said second transmission line for sensing the transmission direction of a signal propagating in the second transmission line to define the required direction for signal transmission between the transceivers and the recording and control unit;
   means connected to said optical sensing means for measuring the energy level of the signal propagating through said second transmission line;
   means interconnected to said measuring means and said optical sensing means for augmenting the energy level of the signal propagating through said second transmission line without interrupting the signal propagation;
   means in each transceiver for transmitting a signal into said second transmission line;
   a DC power supply in each of said transceivers;
   a conductor pair in the cable sections for transmitting a DC voltage to each of said power supplies.

9. In a seismic exploration system having means for enabling a desired switching sequence in, and data transmission from a plurality of transceivers, each of said transceivers having a plurality of input channels and an output channel, and at least one seismic sensor operably coupled to each input channel, said system comprising:
   a recording and control unit;
   a plurality of substantially identical cable sections interconnecting said transceivers to said recording and control unit, each cable section further including a first bidirectional transmission line for transmitting control and data signals independently of each other and in opposite directions between said transceivers and said recording and control unit;
   a second bidirectional transmission line within each of the transceivers for interconnecting the first bidirectional transmission line in each coupled cable section;

means coupled to said second transmission line for sensing the transmission direction of a signal propagating in the second transmission line to define the required direction for signal transmission between the transceivers and the recording and control unit;

means coupled to said sensing means for measuring an energy level of the signal propagating in said second transmission line;

means interconnected to said measuring means and said sensing means for augmenting said energy level of the signal propagating in said second transmission line without interrupting signal propagation;

means in each transceiver for transmitting a signal into said second transmission line; and means for supplying power to each transceiver.

* * * * *